Feb. 15, 1927.
M. B. HAMMOND
1,617,903
SUPPORT FOR VEHICLE BUMPERS
Filed Dec. 2, 1926
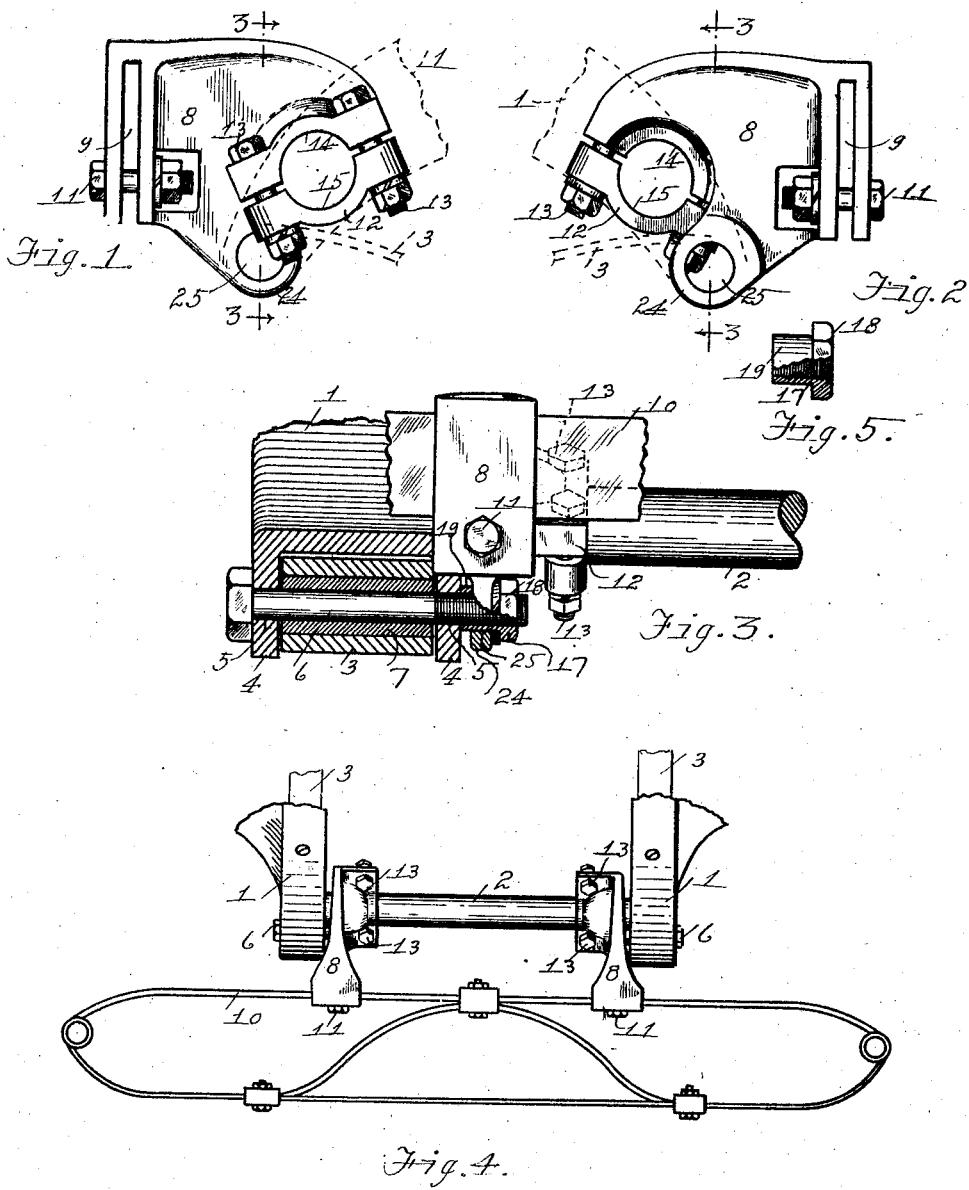
INVENTOR
Milton B. Hammond
BY Cyrus W. Rice
ATTORNEY.
Witness:
G. E. Redding Patented Feb. 15, 1927.

1,617,903

UNITED STATES PATENT OFFICE.

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN.

SUPPORT FOR VEHICLE BUMPERS.

Application filed December 2, 1926. Serial No. 152,096.

The present invention relates to supports for vehicle bumpers; and its object is, generally, to provide an improved device of that character which may be readily mounted on the vehicle; and more particularly, to provide such a device adapted to be mounted on an automobile having frame members connected by a front cross bar.

This and any other and more specific objects hereinafter appearing are attained by, and the invention finds preferable embodiment in, the device hereinafter particularly described in the body of this specification and illustrated by the accompanying drawings, in which—

Figure 1 is a side view of one of the members of a bumper support;

Figure 2 is an opposite side view thereof;

Figure 3 is a front view of the same in mounted position on an automobile, and partially sectioned on a vertical plane corresponding to line 3—3 of Figures 1 and 2;

Figure 4 is a top plan view of the forward portion of an automobile, the bumper support mounted thereon and the bumper carried by the support; and Figure 5 is a side view of a nut, partially sectioned axially, employed in mounting the support on the automobile.

In the accompanying drawings, a support for a bumper of any usual type, such as that seen in Figure 4, is shown mounted on an automobile having parallel spaced frame members 1, 1 extending in the automobile's longitudinal direction and connected at their front ends by a round cross bar 2. The front ends of these frame members are supported by the vehicle springs 3 carried by the automobile's front axle, the downwardly extending spaced ears 4 of said members having openings 5, offset from the cross bar 2 and receiving the bolts 6 which, passing through sleeves 7 in the curled ends of said springs, serve to connect the springs and said frame members together.

The bumper support comprises a pair of members, the elements 8, each having at their front portions suitable means for securing a bumper (as the bumper shown in Figure 4) thereto, such means, in the illustrated construction being the recess 9 receiving the rear bar 10 of the bumper which is clamped in the recess by a threaded bolt 11. Each of the elements 8 has means for detachably mounting it on the automobile, such means, as shown, comprising a clamp 12 detachably connected to the body of said element 8 by threaded bolts 13 extending on the opposite sides of the cross bar 2, this cross bar being received in the semicircular recesses 14, 15 of said body and clamp respectively. The bolt 6 is passed through an opening 25 in an ear 24 of the element 8, said opening being aligned with the frame member's openings 5, and a nut is screwed on the bolt's threaded end, thus completing the mounting of said element on the automobile. The nut already provided for this bolt in the usual construction of such an automobile may, of course, be utilized in thus mounting the element 8 provided said bolt is long enough, but in case the bolt is too short, I provide a nut 17 having a head 18 engaging the element 8 and a shank portion 19 received in said element's opening 25 and threaded on the bolt.

It will be seen that this bumper support may be readily mounted on and demounted from the automobile, and in mounted position is held against turning in a vertical plane by the offset relation of the cross bar 2 and the bolts 6.

The invention being intended to be pointed out in the claims, is not to be limited to or by details of construction of the particular embodiment thereof illustrated by the drawings or hereinbefore described.

I claim:

1. In combination with a vehicle having spaced longitudinally-extending frame members connected by a cross bar and supported by springs and having openings offset from the cross bar receiving bolts connecting the springs with said members, a bumper support comprising: a pair of elements having means for securing a bumper thereto, means for securing said elements on the cross bar and openings aligned with said members' openings and receiving the bolts.

2. In combination with a vehicle having spaced longitudinally-extending frame members connected by a cross bar and supported by springs and having openings offset from the cross bar receiving bolts connecting the springs with said members, a bumper support comprising: a pair of elements having means for securing a bumper thereto, means for securing said elements on the cross bar and openings aligned with said members' openings and receiving the bolts; nuts having heads engaging said elements and shank portions received in their openings and threaded on the bolts.

3. In combination with a vehicle having spaced longitudinally-extending frame members connected by a cross bar and supported by springs and having openings offset from the cross bar receiving bolts connecting the springs with said members, a bumper support comprising: a pair of elements having means for securing a bumper thereto, screw-operated detachable clamps for clamping said elements on the cross bar and openings aligned with said members' openings and receiving the bolts.

In testimony whereof I have hereunto set my hand at Grand Rapids, Michigan, this 23rd day of November, 1926.

MILTON B. HAMMOND.